United States Patent [19]
Benoliel

[11] Patent Number: 5,981,938
[45] Date of Patent: Nov. 9, 1999

[54] OPTO-ELECTRONIC DEVICE

[76] Inventor: Eli Benoliel, Shlomo Hamelech 2, Lod, Israel

[21] Appl. No.: 08/987,636

[22] Filed: Dec. 9, 1997

[51] Int. Cl.$^6$ .................................................. G08C 21/00
[52] U.S. Cl. ............... 250/216; 250/227.11; 250/227.14; 250/227.28; 250/221; 359/618
[58] Field of Search ............................. 250/216, 227.11, 250/227.31, 227.14, 227.28, 574, 221; 359/618; 356/138

[56] References Cited

U.S. PATENT DOCUMENTS

| | | | |
|---|---|---|---|
| Re. 33,213 | 5/1990 | Borden | 250/574 |
| 3,763,372 | 10/1973 | Fedotowsky et al. | 250/211 J |
| 4,270,047 | 5/1981 | Mochizuki et al. | 250/216 |
| 4,346,376 | 8/1982 | Mallos | 340/712 |
| 4,484,179 | 11/1984 | Kasday | 340/365 P |
| 4,673,918 | 6/1987 | Adler et al. | 340/365 P |
| 4,871,232 | 10/1989 | Grinberg et al. | 350/162.11 |
| 5,177,805 | 1/1993 | Groger et al. | 385/12 |
| 5,383,016 | 1/1995 | Amir et al. | 356/150 |
| 5,825,561 | 10/1998 | Ohguri | 359/822 |

*Primary Examiner*—Edward P. Westin
*Assistant Examiner*—Thanh X. Luu
*Attorney, Agent, or Firm*—Mark M. Friedman

[57] ABSTRACT

An opto-electronic device that includes a source of a collimated beam of light, a reflector, and at least on partly reflective surface. The partly reflective surface may be a surface of a detector, or alternatively a surface of a partly reflective material behind which one or more detectors are positioned. The partial reflectivity of the surface is exploited to reflect the light beam several times to the same detector, or alternatively among several detectors. Illustrative applications of the device include a pulse sharpener, a touch screen, a serial-to-parallel converter and an opto-electronic switch.

23 Claims, 7 Drawing Sheets

OPTO-ELECTRONIC DEVICE

FIELD AND BACKGROUND OF THE INVENTION

The present invention relates to opto-electronic devices.

Opto-electronic devices are signal processing devices in which signals may be manipulated either optically or electronically. All such devices must include transducers for converting electronic signals to optical signals or optical signals to electronic signals. Typically, electronic signals are converted to optical signals using modulatable light sources such as laser diodes and LEDs. Optical signals are converted to electronic signals using suitable detectors such as InSb-based detectors, bolometers and photomultipliers. Typically, the surfaces of these detectors are partially reflective. As a result, the detectors are less than 100% efficient, and the reflected light may impinge on other detectors in the same device, creating spurious signals. To minimize these adverse effects of partial reflectivity, the surfaces of the detectors commonly are coated with anti-reflective coatings.

SUMMARY OF THE INVENTION

The present invention is of a family of opto-electronic devices that exploits the partial reflectivity of detector surfaces instead of suppressing it.

According to the present invention there is provided an opto-electronic device including: (a) a first reflector having a reflective surface; (b) a second reflector, having a surface substantially parallel to the surface of the first reflector, at least part of the surface of the second reflector being partly reflective, the first reflector and the second reflector defining a gap therebetween; and (c) a first light source operative to introduce a first collimated beam of light into the gap at an oblique angle to the surfaces of the first and second reflectors.

According to the present invention there is provided an opto-electronic device, including: (a) at least one source of a collimated beam of light; (b) at least one detector having a partly reflective surface; and (c) for each of the at least one source, a reflector disposed to reflect the collimated beam of light to at least one of the at least one detector.

In the most basic device of the present invention, one or more detectors are disposed with their partly reflective surfaces parallel to a planar reflector. A collimated beam of light is directed into the gap between the reflector and the detector or detectors, at an oblique angle to the reflector. Preferably, this oblique angle is close to, but not equal to, a right angle, so that the light beam undergoes multiple reflections, traversing a zigzag optical path within the gap. At each point along the detector or detectors where the light beam is incident, part of the incident energy is converted to an electronic signal, and the rest of the energy is reflected. In one application of the device, as a component of a touch screen, interrupting the light beam somewhere along the optical path causes less light to be absorbed by the detector or detectors than would otherwise be the case. The energy of the electronic signal then is a function of the lateral position of the interruption along the gap. In another application of the device, as a serial-to-parallel converter, a modulated light beam is partly absorbed and converted to an electronic signal by successive detectors. A signal incident in a single input channel thus is dispersed among several output channels. In yet another application of the device, the geometry of the device is arranged so that the travel time along the optical path is comparable to the length of the incident optical pulse, and the electronic circuitry to which the detector or detectors are connected is such that output is triggered only when input exceeds a certain threshold. With a suitably chosen threshold, output is triggered only when most of the incident pulse is actually propagating inside the gap, and the device functions as a pulse sharpener.

In another embodiment of the device of the present invention, one or more steerable reflectors are provided to direct incident collimated light beams to the appropriate detectors; and the detectors themselves are steerable, so that each detector can be tilted to partly reflect the light incident thereon to another detector. This embodiment of the device functions as an opto-electronic switch.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a family of opto-electronic devices. Applications of the devices of the present invention include touch screens, serial-to-parallel converters, pulse sharpeners and opto-electronic switches.

The principles and operation of the present invention may be better understood with reference to the drawings and the accompanying description.

Figure 1:
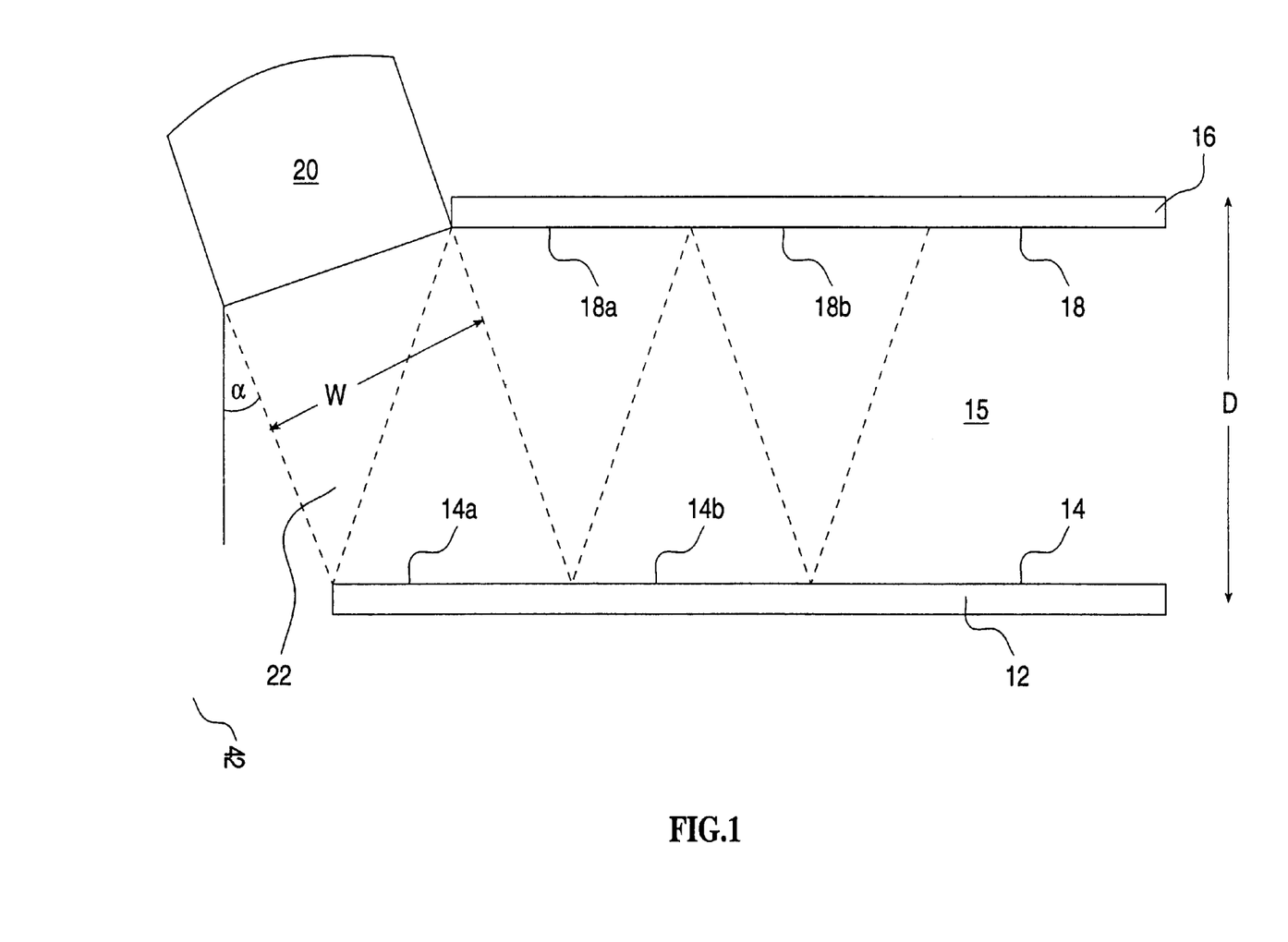
FIG. 1 is a schematic depiction of the geometry of the basic embodiment of the present invention.

Referring now to the drawings, FIG. 1 is a schematic depiction of the geometry of the basic embodiment of the present invention. A reflector 12 has a flat planar perfectly reflecting surface 14. A detector 16 has a flat planar partly reflecting surface 18. The reflection coefficient of detector 16 is $\beta$: of light incident on surface 18, a fraction $\beta$ is reflected and 1-$\beta$ is absorbed and converted to electrical energy. Surfaces 14 and 18 are parallel and are separated by a distance D, thereby defining a gap 15 between surfaces 14 and 18. A source 20 of a collimated beam 22 of light of width W is provided to direct beam 22 towards surface 14 at an angle $\alpha$ to the normal with respect to surface 14. Beam 22 is first incident on a portion 14a of surface 14. Beam 22 is totally reflected from portion 14a and is incident on a portion 18a of surface 18. A fraction $\beta$ of beam 22 is reflected from portion 18a and is incident on a portion 14b of surface 14. Beam 22 then is totally reflected from portion 14b and is incident on a portion 18b of surface 18, whence a fraction $\beta$ of the incident light is further reflected back to surface 14. Beam 22 proceeds to propagate along a zigzag optical path in gap 15. At successive portions of surface 18, the portion of the energy of beam 22 absorbed is successively 1-$\beta$, $\beta(1-\beta)$, $\beta^2(1-\beta)$, $\beta^3(1-\beta)$, etc. If $\alpha=\arcsin(W/2D)$ then successive portions of surfaces 14 and 18, on which beam 22 is incident, are adjacent and nonoverlapping, as drawn in FIG. 1.

The following illustrative example shows how the device of FIG. 1 can be used as a pulse sharpener. Let D be 7.5 cm, and let $\alpha$ be close to zero, so that it takes about 0.5 ns for beam 22 to travel from surface 18 to surface 14 and back. Let the total length of detector 16 be 4W so that there are four responsive portions of surface 18: portions 18a and 18b as shown in FIG. 1, followed by portions 18c and 18d (not shown). Suppose that source 20 emits a rectangular pulse of light of unit amplitude with a duration of 2 ns. The following table shows the signal produced by detector 16, normalized to correspond to the fraction of incident light absorbed. Time is counted starting from when the leading edge of the light pulse reaches portion 18a.

| Time interval (ns) | responsive portions affected | signal |
| --- | --- | --- |
| 0.0 to 0.5 | 18a | 0.1 |
| 0.5 to 1.0 | 18a, 18b | 0.19 |
| 1.0 to 1.5 | 18a, 18b, 18c | 0.271 |
| 1.5 to 2.0 | 18a, 18b, 18c, 18d | 0.3439 |
| 2.0 to 2.5 | 18b, 18c, 18d | 0.2439 |
| 2.5 to 3.0 | 18c, 18d | 0.1539 |
| 3.0 to 3.5 | 18d | 0.0729 |

If the circuitry connected to detector 18 is arranged to pass only signals exceeding a threshold of 0.3, then an electronic pulse of 0.5 ns duration is produced, in the time interval between 1.5 ns and 2.0 ns. The 2 ns optical pulse thus is shortened to a 0.5 ns electronic pulse.

Figure 2:
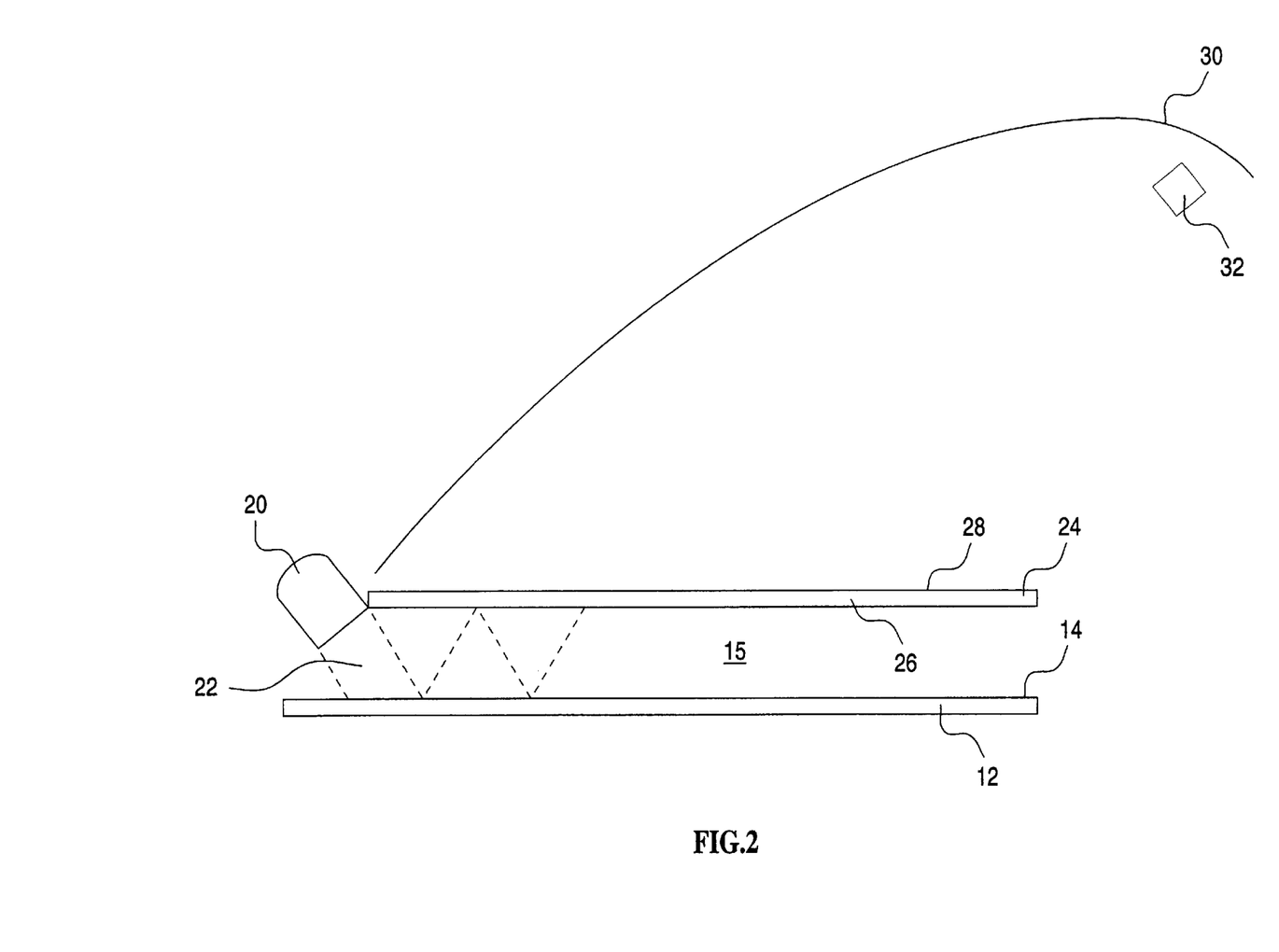
FIG. 2 is a second version of the embodiment of FIG. 1.

FIG. 2 shows, schematically, a second version of the basic embodiment of the present invention. In this version, detector 16 is replaced by a flat panel 24 of a transparent material having a reflection coefficient $\beta$ at proximal surface 26. As in the version of FIG. 1, a fraction $\beta$ of the light incident on proximal surface 26 is reflected, and a fraction $1-\beta$ enters panel 24. Light emerging from distal side 28 of panel 24, at essentially the same angle $\alpha$ with respect to the normal as the light incident on proximal surface 26, is reflected by a parabolic reflector 30 to a detector 32 located at the focus of parabolic reflector 30. This version of the basic embodiment has the advantage over the version of FIG. 1 that the length of the device is not constrained by the length of a practical detector 16.

Figure 3A:
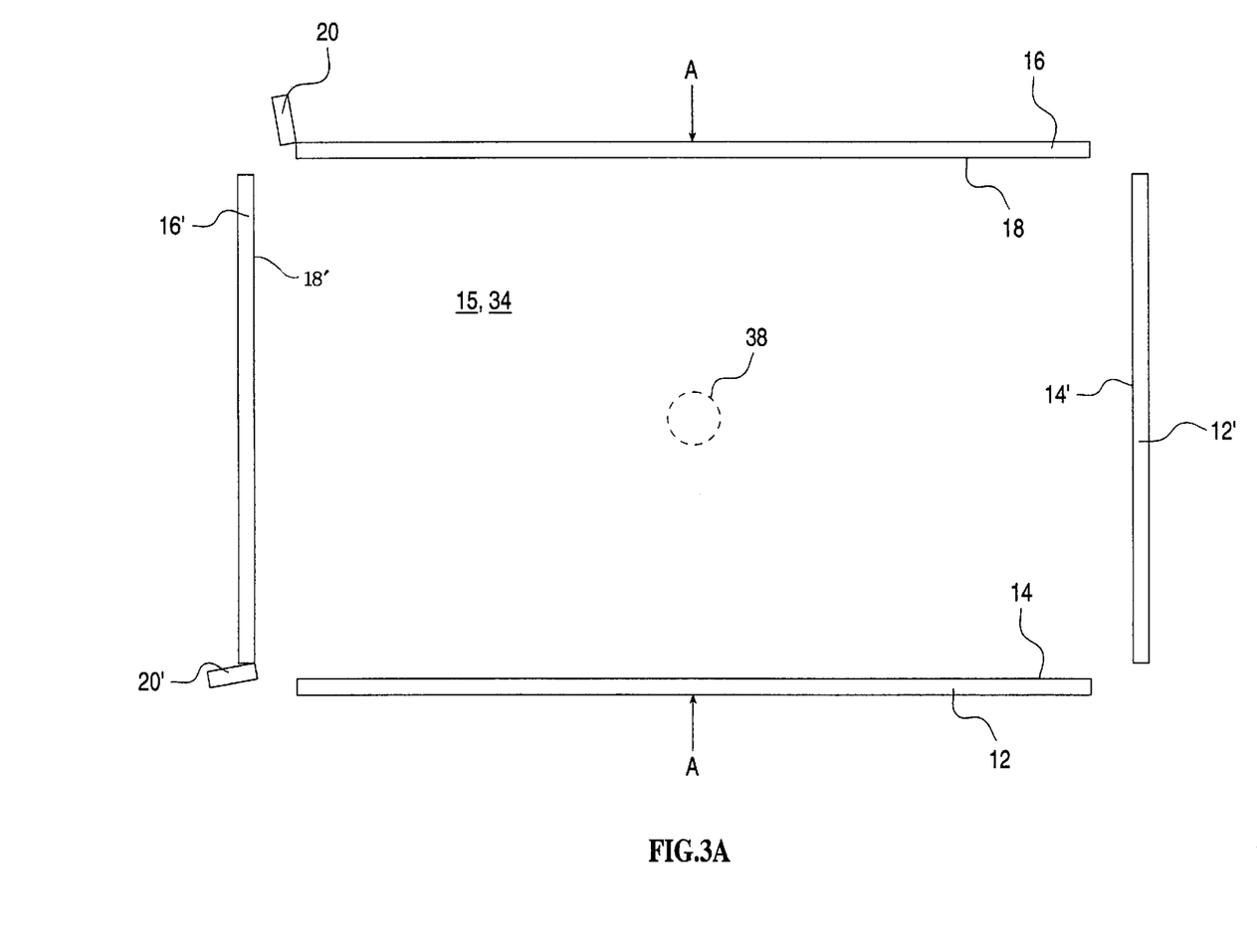
FIG. 3A is a longitudinal cross section of a touch screen of the present invention.
Figure 3B:
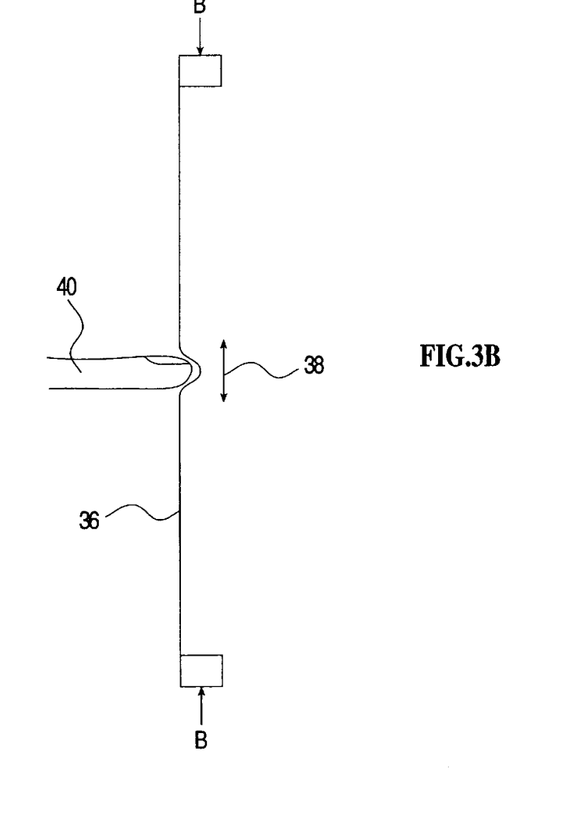
FIG. 3B is a transverse cross section of the touch screen of FIG. 3A.

FIGS. 3A and 3B show, schematically, a device of the present invention configured as a touch screen. FIG. 3A is a longitudinal cross section of the device along cut B—B of FIG. 3B. FIG. 3B is a transverse cross section of the device along cut A—A of FIG. 3A. In the device of FIGS. 3A and 3B, reflector 12 and detector 16 are accompanied by another reflector 12', having a totally reflective surface 14' perpendicular to surface 14, and another detector 18' having a partly reflective surface 18' perpendicular to surface 18. A light source 20' provides a collimated beam of light that traverses a zigzag path through the gap 34 defined by reflector 12' and detector 16', just as light source 20 provides a collimated beam of light that traverses a zigzag path through gap 15. A flexible membrane 36 spans reflectors 12 and 12' and detectors 16 and 16'. Membrane 36 is shown depressed into gaps 15 and 34 by a finger 40 of a user, creating a blockage 38 that interrupts the zigzag paths of the light beams from sources 20 and 20'. As a result, less light is detected by detectors 16 and 16' than would be detected absent blockage 38. Furthermore, the amount of light detected by detector 16 is a monotonic function of the horizontal displacement of blockage 38 between reflector 12' and detector 16'; and the amount of light detected by 16' is a monotonic function of the vertical displacement of blockage 38 between reflector 12 and detector 16. Therefore, the device of FIGS. 3A and 3b may be used as a touch screen, with the signals from detectors 16 and 16' indicating respectively the horizontal and vertical coordinates of blockage 38.

Figure 4:
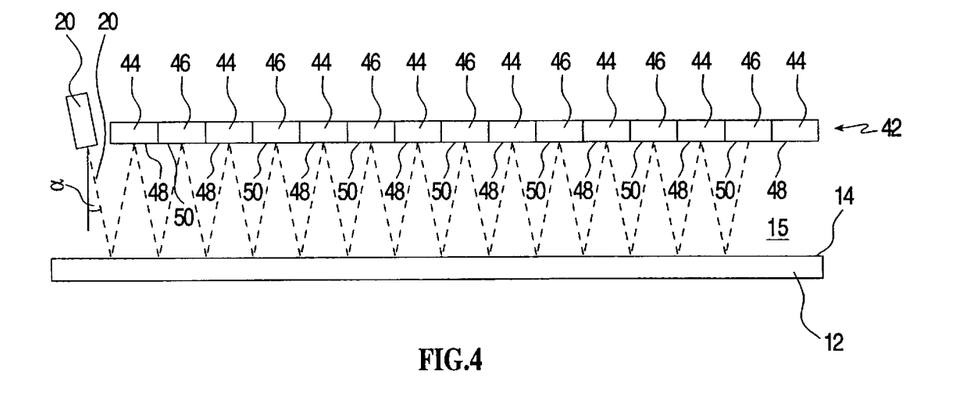
FIG. 4 is a schematic depiction of a serial-to-parallel converter of the present invention.

FIG. 4 shows a device of the present invention configured as a serial-to-parallel converter. As in the basic embodiment of FIG. 1, reflector 12 includes a flat planar perfectly reflecting surface 14, and source 20 directs collimated light beam 22 towards surface 14 at angle $\alpha$ to the normal. Single detector 16 is replaced by a second reflector 42 that includes many detectors 46 separated by spacers 44. Surfaces 48 of spacers 44 are perfectly reflective. Surfaces 50 of detectors 46 are partly reflective. Surfaces 48 and 50 together constitute a flat planar surface of reflector 42. Collimated beam 22 is modulated to carry a signal, for example as a sequence of pulses. As collimated beam 22 reverberates between surface 14 and surfaces 48 and 50, collimated beam 22 is incident successively on each detector 46. In this way, the information carried by the signal encoded in collimated beam 22 is distributed among channels (not shown) that are electronically coupled to detectors 46.

Figure 5A:
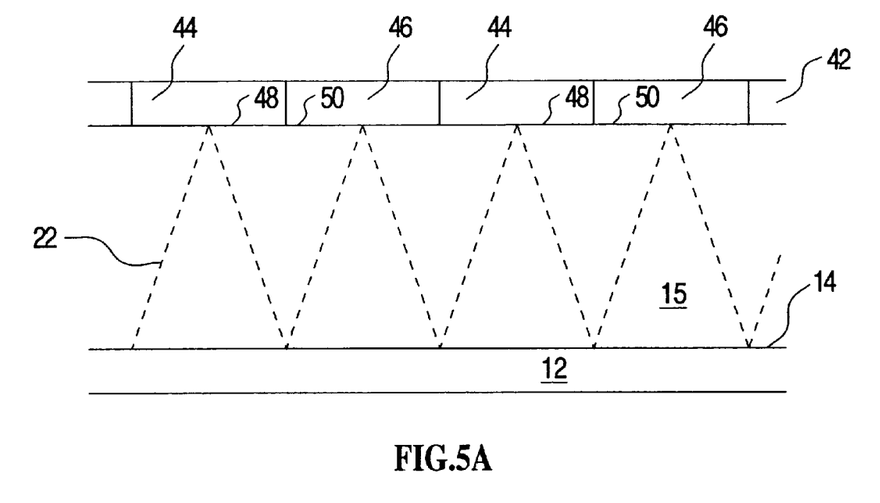
FIG. 5A through 5C illustrate mechanisms for compensating for beam spread.
Figure 5B:
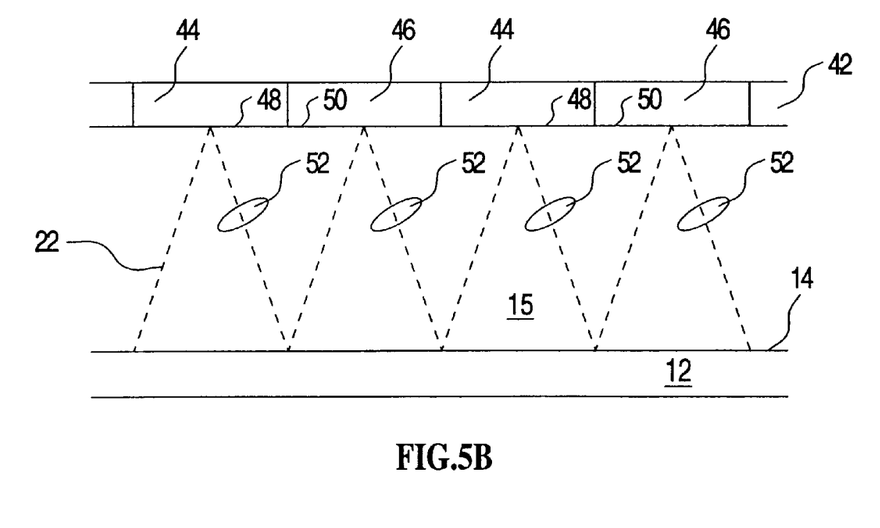
Figure 5C:
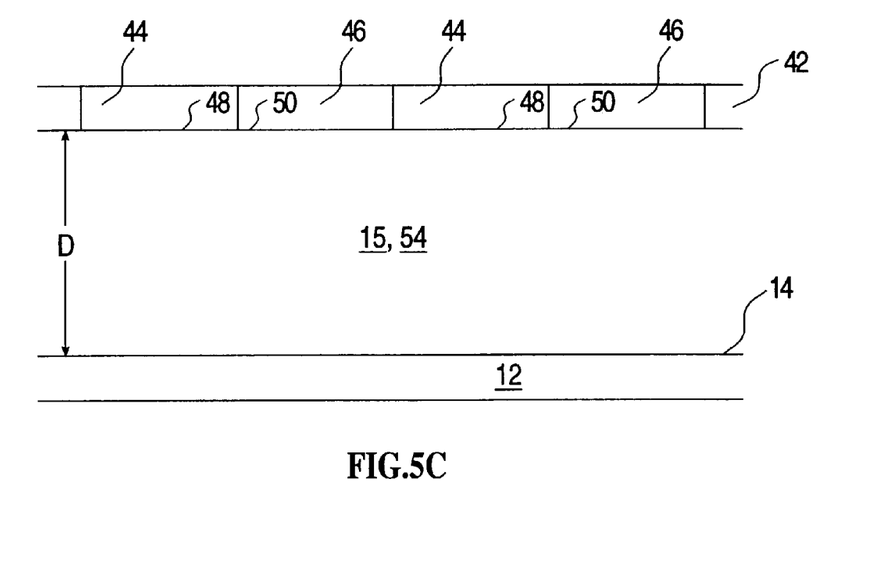
Figure 5D:
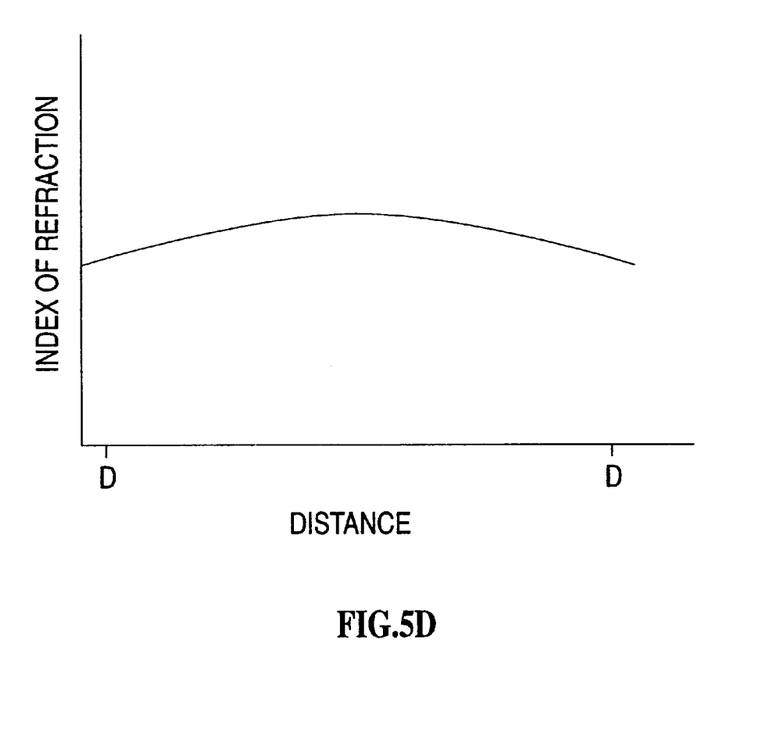
FIG. 5D is a conceptual graph of the index of refraction of the medium of FIG. 5C.

In general, beam 22 is not perfectly collimated. FIGS. 5A, 5B and 5C show two mechanisms for compensating for the spread of beam 22 as beam 22 propagates through gap 15. FIG. 5A shows a portion of the device of FIG. 4, in which surfaces 48 and 50 are slightly concave, to focus beam 22 back to surface 14. Alternatively, or supplementarily, a similar curvature may be provided to surface 14. FIG. 5B shows a portion of the device of FIG. 4, in which lenses 52 are provided in gap 15 to focus beam 22 back to surface 14. FIG. 5C shows a portion of the device of FIG. 4 in which gap 15 is filled with a medium 54 that has a vertically varying index of refraction, a conceptual graph of which is shown in FIG. 5D. The index of refraction of medium 54 is slightly higher halfway between reflectors 12 and 42 than close to reflectors 12 and 42, so that medium 54 refracts beam 22 in the same manner as lenses 52. Each of concave surfaces 48 and 50, each of lenses 52 and each pass of beam 22 through medium 54 provides only partial compensation for the spread of beam 22, but concave surfaces 48 and 50, or lenses 52, cooperate to ensure that the width of beam 22 remains sufficiently controlled throughout gap 15 that each leg of beam 22 is incident on only one surface 48 or 50.

Figure 6:
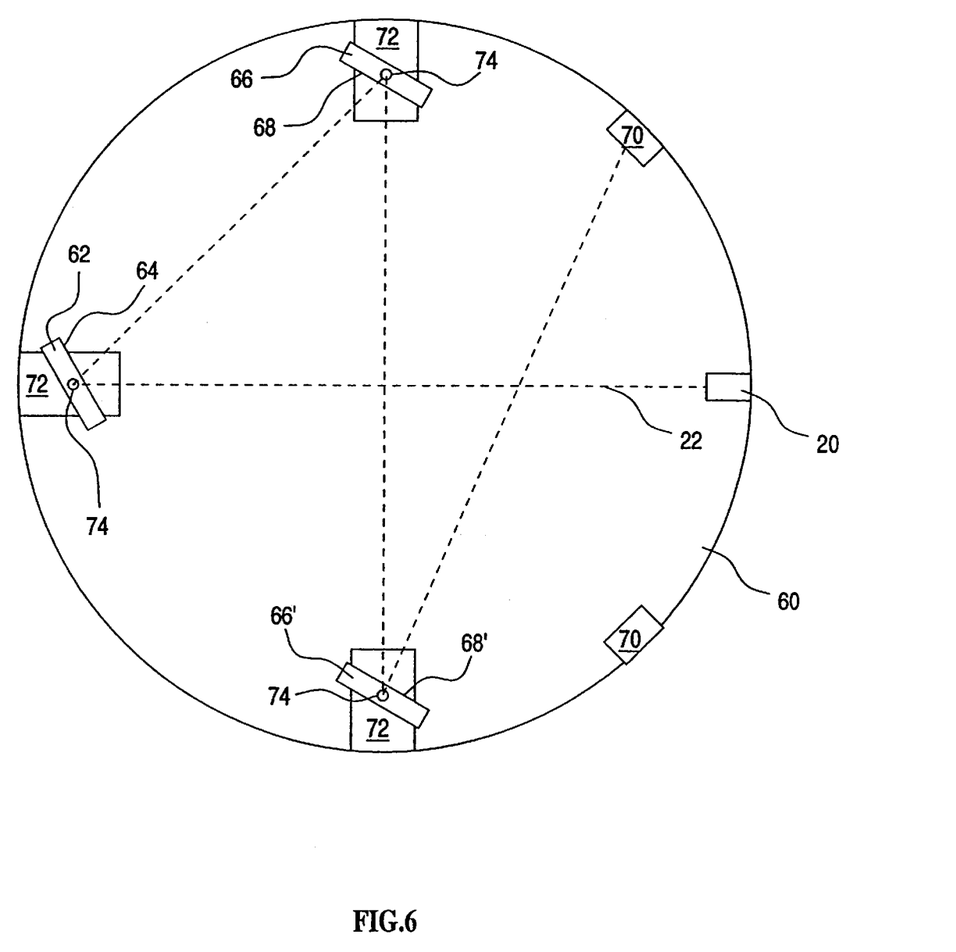
FIG. 6 is a schematic diagram of an opto-electronic switch of the present invention.

The device of the present invention described above are passive, in the sense that they have no moving parts. FIG. 6 illustrates an active device according to the present invention, configured as an opto-electronic switch. The device of FIG. 6 includes a reflector 62 with a perfectly reflecting planar surface 64 and two detectors 66 and 66' with partly reflecting planar surfaces 68 and 68'. Detectors 66 and 66' are coupled electronically to two different communications channels (not shown). Reflector 62 and detectors 66 and 66' are mounted on shafts 74 of stepping motors 72. Stepping motors 72 in turn are mounted around the inner circumference of a circular housing 60. Also mounted on the inner circumference of housing 60 are absorbers 70 which totally absorb incident light.

Stepping motors 72 are used to steer reflector 62 and detectors 66 and 68, so that the following four options are available for directing signals encoded in collimated light beam 22 that emerges from source 20:

(1) Reflector 62 directs beam 22 to detector 66. Detector 66 directs beam 22 to one of absorbers 70. The signal encoded in beam 22 is directed to the channel coupled to detector 66.

(2) Reflector 62 directs beam 22 to detector 66'. Detector 66' directs beam 22 to one of absorbers 70. The signal encoded in beam 22 is directed to the channel coupled to detector 66'.

(3) Reflector 62 directs beam 22 to detector 66. Detector 66 directs beam 22 to detector 66'. Detector 66' directs beam 22 to one of absorbers 70. The signal encoded in beam 22 is directed to both channels.

(4) Reflector 62 directs beam 22 to detector 66'. Detector 66' directs beam 22 to detector 66. Detector 66 directs beam 22 to detector 22 to one of absorbers 70. The signal encoded in beam 22 is directed to both channels.

The purpose of absorbers 70 is to terminate the propagation of beam 22 within housing 60 to prevent spurious reflections of beam 22 within housing 70 from giving rise to crosstalk between the channels or multiple transmissions on the channels. It will be appreciated that the device of FIG. 6 may be upgraded to any convenient number of sources, reflectors and detectors to service a corresponding number of communications channels. In particular, because light beams such as beam 22 can intersect without interfering with each other, more than one source 20 can be used in a device such as the device of FIG. 6.

While the invention has been described with respect to a limited number of embodiments, it will be appreciated that many variations, modifications and other applications of the invention may be made.

What is claimed is:

1. An opto-electronic device comprising:

(a) a first reflector having a reflective surface;

(b) a second reflector, having a surface substantially parallel to said surface of said first reflector, at least part of said surface of said second reflector being partly reflective, said second reflector including at least one light detector, said partly reflective part of said surface of said second reflector including a surface of said at least one light detector, said first reflector and said second reflector defining a gap therebetween; and (c) a first light source operative to introduce a first collimated beam of light into said gap at an oblique angle to said surfaces of said first and second reflectors.

2. The device of claim 1, wherein said surface of said first reflector and said surface of said second reflector are substantially planar.

3. The device of claim 1, further comprising:

(d) at least one light detector positioned to detect light emerging from said gap via said partly reflective part of said surface of said second reflector.

4. The device of claim 3, wherein said partly reflective part of said surface of said second reflector occupies a plurality of disjoint regions, there being one of said at least one light detector for each of said regions.

5. The device of claim 1, wherein said partly reflective part of said surfaced of said second reflector occupies a plurality of disjoint regions, and wherein said second reflector includes a plurality of said at least one light detector, each of said regions including a surface of one of said plurality of light detectors.

6. The device of claim 1, wherein at least one surface selected from the group consisting of said surface of said first reflector and said surface of said second reflector is shaped to compensate for spreading of said first collimated beam of light.

7. The device of claim 1, further comprising:

(d) a mechanism in said gap for compensating for spreading of said first collimated beam of light.

8. The device of claim 7, wherein said mechanism includes at least one lens.

9. The device of claim 7, wherein said mechanism includes a medium having a spatially varying index of refraction.

10. The device of claim 1, further comprising:

(d) a third reflector having a reflective surface;

(e) a fourth reflector, having a surface substantially parallel to said surface of said third reflector, at least part of said surface of said fourth reflector being partly reflective, said third reflector and said fourth reflector being on opposite sides of said gap; and (f) a second light source operative to introduce a second collimated beam of light into said gap at an oblique angle to said surfaces of said third and fourth reflectors.

11. The device of claim 10, wherein said surfaces of said third and fourth reflectors are substantially perpendicular to said surfaces of said first and second reflectors.

12. The device of claim 10, wherein said reflective surface of said third reflector and said reflective surface of said fourth reflector are substantially parallel.

13. The device of claim 1, further comprising:

(d) a flexible membrane, disposed adjacent to said gap so that local pressure on said membrane urges a portion of said membrane into said gap, thereby blocking said first collimated beam of light.

14. An opto-electronic device, comprising:

(a) at least one source of a collimated beam of light;

(b) a plurality of detectors, each of said detectors having a partly reflective surface; and (c) for each of said at least one source, a reflector, substantially parallel to said surfaces of said detectors, said at least one source and said reflector being disposed so that said collimated beam of light is reflected by said reflector to impinge successively on each of said plurality of detectors.

15. The device of claim 14, wherein said reflector is disposed to reflect said collimated beam of light to said one of said at least one detector so that said collimated beam of light impinges on said one of said at least one detector at least twice.

16. The device of claim 14, having a plurality of said detectors, and wherein said reflector is steerable to direct said collimated beam of light at any of said detectors.

17. The device of claim 16, wherein each of said plurality of detectors is steerable to reflect said collimated beam of light incident thereon to another of said detectors.

18. The device of claim 16, further comprising:

(d) an absorber;

and wherein each of said plurality of detectors is steerable to reflect said collimated beam of light incident thereon to said absorber.

19. An opto-electronic device comprising:

(a) a first reflector having a reflective surface;

(b) a second reflector, having a surface substantially parallel to said surface of said first reflector, at least part of said surface of said second reflector being partly reflective, said first reflector and said second reflector defining a gap therebetween;

(c) a first light source operative to introduce a first collimated beam of light into said gap at an oblique angle to said surfaces of said first and second reflectors;

(d) a third reflector having a reflective surface;

(e) a fourth reflector, having a surface substantially parallel to said surface of said third reflector, at least part of said surface of said fourth reflector being partly reflective, said third reflector and said fourth reflector being on opposite sides of said gap; and (f) a second light source operative to introduce a second collimated beam of light into said gap at an oblique angle to said surfaces of said third and fourth reflectors.

20. The device of claim 19, wherein said surfaces of said third and fourth reflectors are substantially perpendicular to said surfaces of said first and second reflectors.

21. The device of claim 19, wherein said reflective surface of said third reflector and said reflective surface of said fourth reflector are substantially parallel.

22. An opto-electronic device, comprising:

(a) at least one source of a collimated beam of light;

(b) a plurality of detectors, each said detector having a partly reflective surface; and (c) for each of said at least one source, a reflector that is steerable to reflect said collimated beam of light at any of said detectors; each of said detectors being steerable to reflect said collimated beam of light incident thereon to another of said detectors.

23. An opto-electronic device, comprising:

(a) at least one source of a collimated beam of light;

(b) a plurality of detectors, each said detector having a partly reflective surface;

(c) for each of said at least one source, a reflector that is steerable to reflect said collimated beam of light at any of said detectors; and (d) an absorber, each of said plurality of detectors being steerable to reflect said collimated beam of light incident thereon to said absorber.

* * * * *